United States Patent [19]
Curtis

[11] Patent Number: 5,988,955
[45] Date of Patent: Nov. 23, 1999

[54] LUG NUT TAPER TRUEING TOOL

[76] Inventor: John Michael Curtis, R.D. #1, Box 227J, Cowansville, Pa. 16218

[21] Appl. No.: 09/252,345

[22] Filed: Feb. 18, 1999

[51] Int. Cl.⁶ ........................................... B23B 41/00
[52] U.S. Cl. ............................................ 408/79; 408/115 R
[58] Field of Search ................... 408/79, 115 R, 408/115 B, 72 R, 72 B, 22 S, 80, 81, 82

[56] References Cited

U.S. PATENT DOCUMENTS

| | | | |
|---|---|---|---|
| 1,520,623 | 12/1924 | Weiskoff | 408/79 |
| 2,406,326 | 8/1946 | Engbrecht | 408/115 R |
| 2,651,951 | 9/1953 | Altenburger | 408/115 R |
| 2,722,855 | 11/1955 | Van Scoy | 408/81 |
| 3,230,834 | 1/1966 | Bohannon | 408/79 |
| 3,286,553 | 11/1966 | Spencer et al. | 408/79 |
| 3,836,277 | 9/1974 | Brooks | 408/82 |
| 3,838,935 | 10/1974 | Boyajian . | |
| 4,288,180 | 9/1981 | Trevarrow | 408/2 |
| 4,346,508 | 8/1982 | Baumann et al. | 408/115 R |
| 4,391,558 | 7/1983 | Perry | 408/115 R |
| 4,507,026 | 3/1985 | Lund . | |
| 4,548,530 | 10/1985 | Weiblen | 408/79 |
| 4,601,618 | 7/1986 | McEldowney . | |
| 4,743,149 | 5/1988 | Geise . | |
| 4,850,756 | 7/1989 | Dubois | 408/72 R |
| 4,896,663 | 1/1990 | Vandewalls | 408/115 R |
| 4,915,551 | 4/1990 | Watson et al. . | |
| 5,076,742 | 12/1991 | Lee at al. | 408/115 R |
| 5,146,961 | 9/1992 | Schoeller | 408/115 R |
| 5,174,693 | 12/1992 | Lee at al. | 408/115 R |
| 5,302,057 | 4/1994 | Siegfreid | 408/72 R |
| 5,544,987 | 8/1996 | Gipson | 408/72 R |
| 5,609,444 | 3/1997 | Valsecchi | 408/115 R |
| 5,628,591 | 5/1997 | Gamble . | |

FOREIGN PATENT DOCUMENTS

| | | | |
|---|---|---|---|
| 48410 | 3/1982 | Japan | 408/115 R |

*Primary Examiner*—Andrea L. Pitts
*Assistant Examiner*—Adesh Bhargava
*Attorney, Agent, or Firm*—Aileen Champion Addessi

[57] ABSTRACT

The lug nut taper trueing tool includes a first disk which is positioned on one side of an automobile racing wheel and a second disk which is positioned on an opposite side of the wheel. The first disk has an extension sized to fit and extend within the center wheel hole of the automobile wheel. The first disk has a center bore, and a plurality of holes which are alignable with lug nut holes of the wheel. A bushing is positioned and secured within the plurality of holes of the first disk and has a flange which fits and extends within the lug nut holes of the wheel. The bushing has a bore for insertion of a pin, which is attached to a cutting tool. The second disk is attached to a threaded shaft, which is engagable with the first disk for securing the first disk, second disk, and wheel together. The cutting tool has at least one cutting edges and may have either a handle for a person to manually rotate the cutting tool or a shaft end for attachment to an automatic rotation device.

20 Claims, 2 Drawing Sheets

LUG NUT TAPER TRUEING TOOL

BACKGROUND OF THE INVENTION

The invention relates to automobile racing and, more particularly, to a trueing tool for trueing up lug nut holes of a vehicles wheel.

In automobile racing, the concentricity and consistency of wheels is extremely important.

Many wheels used in racing have holes and tapered seats which are stamped. These holes are irregular and inconsistent.

A tool for removing material is disclosed in U.S. Pat. No. 4,743,149 to Geise and entitled "Header Tube Tool". The tool is used to remove material from a body about the circumference of an aperture through the body. However, the tool does not disclose concentrically aligning a cutting tool with a lug nut hole of an automobile wheel.

Therefore, what is needed is an apparatus for trueing up a lug nut hole of an automobile which utilizes alignment means for enabling a cutting tool to concentrically remove debris, cut, and true the lug nut hole.

SUMMARY OF THE INVENTION

A lug nut taper trueing tool for a vehicle wheel, which has a first side, a second side, a wheel hole therethrough, and a plurality of lug nut holes includes a first securement member having a first plate positioned on the first side of the wheel. The first plate has an extension and a threaded bore at least partially therethrough, which are positioned substantially at a center of the first plate. The extension is sized to fit within and extend at least partially through the wheel hole of the wheel. The first plate has at least one hole positioned between the bore and an outer edge of the first plate and alignable with the lug nut holes of the wheel.

A second securement member includes a second plate positioned on the second side of the wheel. A third securement member includes a threaded shaft, which is threadedly engagable with the threaded bore of the first plate.

A bushing is positioned within the hole of the first disk and has a flange sized to fit within the lug nut hole of the wheel. The bushing has a bore at least partially therethrough.

The lug nut taper trueing tool further includes a cutting tool having a first end, a second end, and a shank therebetween. The cutting tool has a pin extending from the first end and is sized for insertion into the bore of the bushing. The first end has at least one cutting edge for cutting the lug nut hole while the pin is disposed within the bushing. The second end of the cutting tool has either a knurled handle for enabling a person to grasp the handle for manual rotation of the cutting tool, or a shaft end for insertion into a drill or other similar equipment for automatic rotation of the cutting tool.

The lug nut taper trueing tool will allow the user to precisely cut the holes and tapers for positive fit and alignment. It will also maintain a precise hole, angle and seat which will add life to the wheel. The lug nut taper trueing tool can also make the user aware of a wheel that may have been damaged in a racing accident that is no longer in tolerance and should be discarded for safety reasons.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

Figure 1:
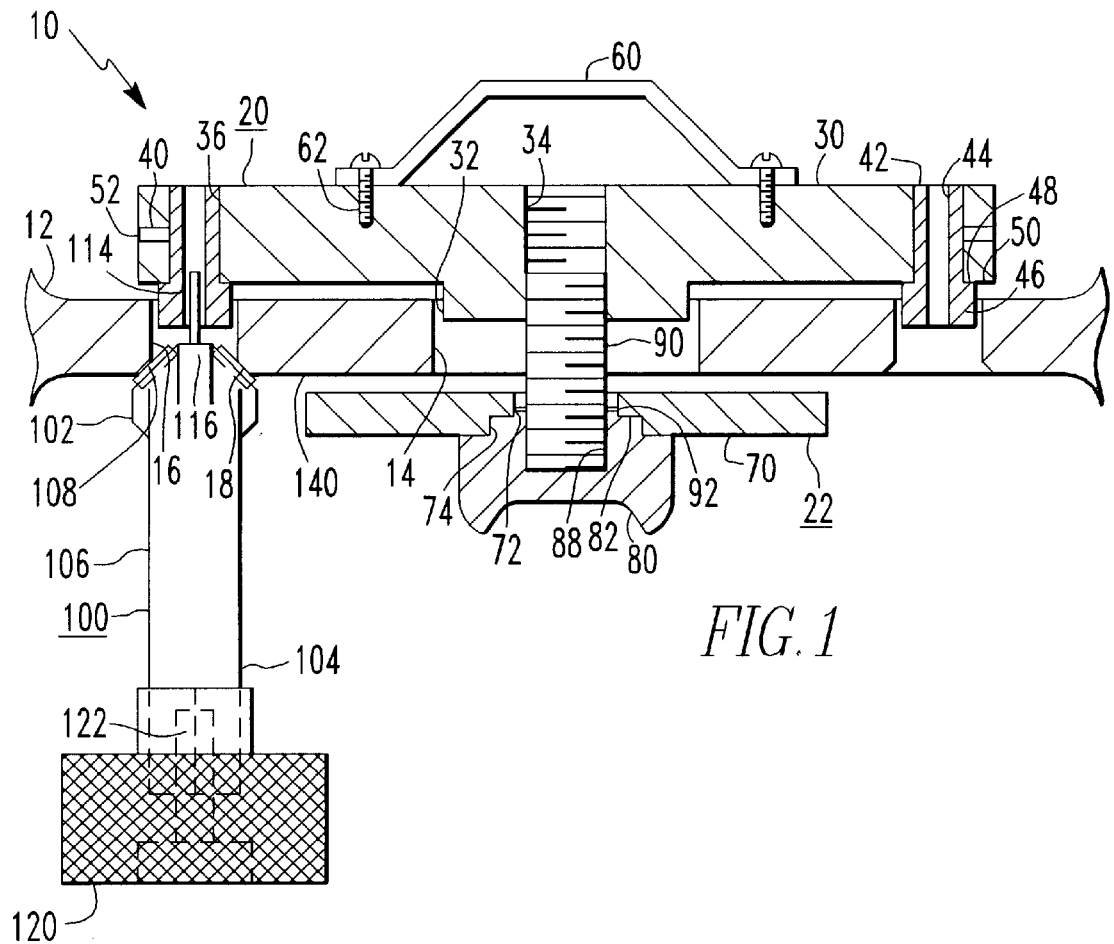
FIG. 1 is a cross-sectional view of a lug nut taper trueing tool.
Figure 2:
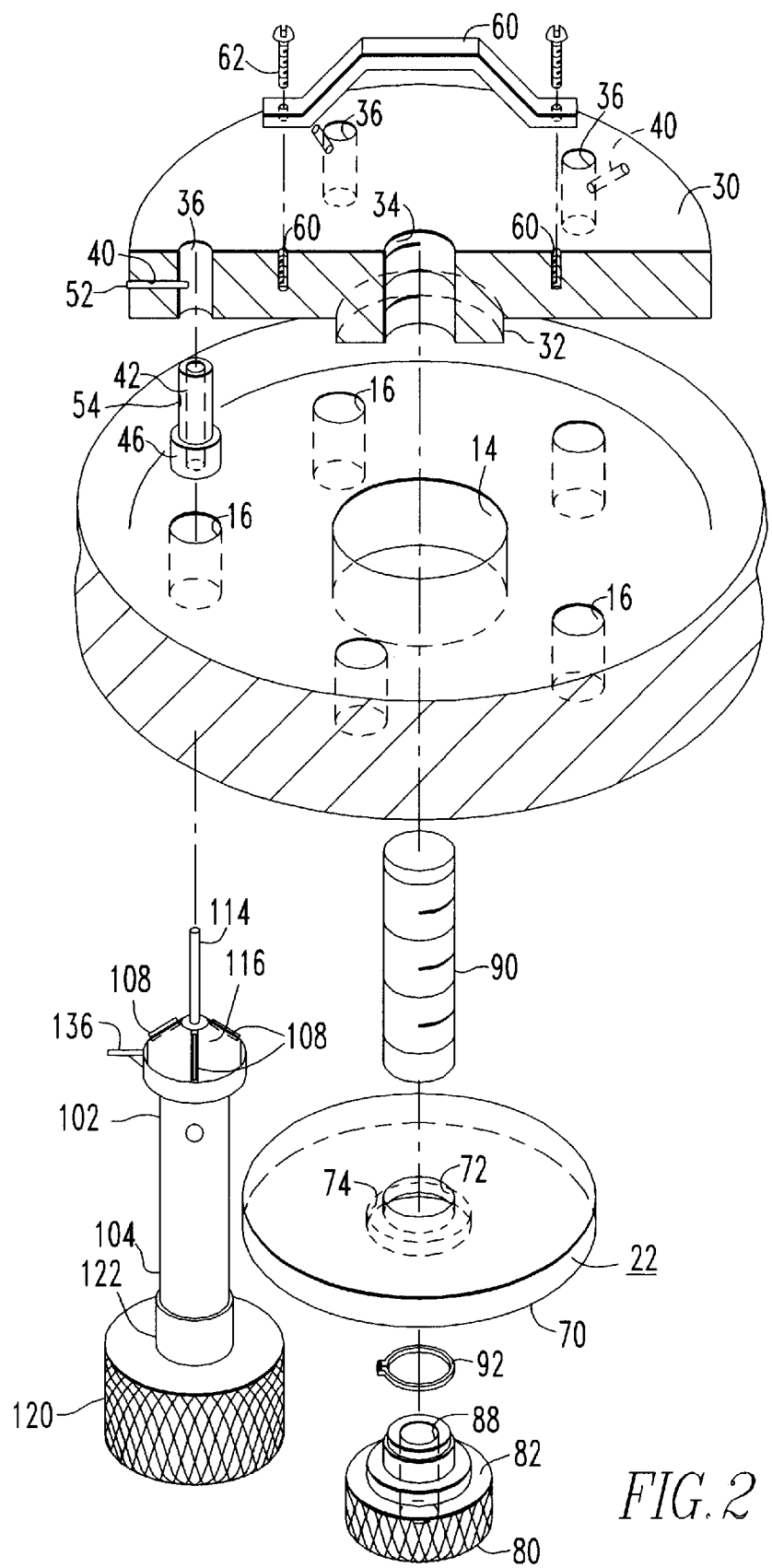
FIG. 2 is an exploded view of the lug nut taper trueing tool.

Referring to FIGS. 1 and 2, a lug nut taper trueing tool 10 is used to remove material from an automobile wheel 12 to true up the seat angle of the wheel. The automobile wheel 12 includes a center wheel hole 14 and five lug nut holes 16 with a seat angle or a taper 18. The trueing tool 10 includes a first securement member 20 positioned on one side of the wheel 12 and a second securement member 22 positioned on the other side of the wheel 12.

As one example, a first securement member 20 may include a first plate, such as a first disk 30, with an extension 32 sized and adapted to fit within the center hole 14 of the wheel 12 and which extends at least partially within the wheel hole 14. The disk 30 further includes a threaded center bore 34 which extends at least partially therethrough. The disk 30 has holes 36 extending therethrough and positioned to be aligned with the lug nut holes 16 of the wheel 12. The holes 36 are positioned between the center bore 34 and an outer edge 38 of the disk. Preferably, the disk 30 has an equal number of holes 36 as the number of lug nut holes 16 of the wheel 12. The extension 32 aids in the alignment and precise positioning of the holes 36 with respect to the lug nut holes 16. A bore 40 is positioned perpendicular to the hole 36 and extends from the outside diameter of the disk 30 to each hole 36.

A bushing 42 has a hole 44 at least partially therethrough. The bushing 42 is positioned within the hole 36 and further includes a flange 46 with a shoulder 48, which extends beyond the hole 36 and beyond an edge 50 of the disk 30. The flange 46 is sized and adapted to fit within the lug nut hole 16 of the wheel 12. A set screw 52 is disposed through the bore 40 and engages a slot 54 of the bushing 42 for retaining and securing the bushing 42 within the hole 36 of the disk 30. Preferably, the bushing 42 is a separate component for enabling the bushing 42 to be replaced, for example, due to wear or damage, however, the bushing 42 may be integrally formed with the first disk 30. Preferably, the guide bushing 42 is formed of steel and the disk 30 is formed of aluminum.

A handle 60 is attached to the disk 30 on an opposite side of the disk 30 as the positioning of the extension 32. The handle 60 may be attached with screws 62, bolts, any other type of fastener, or integrally formed with the disk 30. The handle 60 enables a person to easily carry and manipulate the trueing tool 10.

As one example, a second securement member 22 of the truing tool 10 may include a second plate, such as a second disk 70, having a bore 72 therethrough with a countersunk bore 74. The second securement member 22 further includes a knurled handle 80 having a stepped extension 82 corresponding to the bores 72 and 74 of the second disk 70. The stepped extension 82 has a first shoulder and a second shoulder. The knurled handle 80 has a threaded bore 88 at least partially therethrough. Preferably, the first and second plates have a circular shape corresponding to the shape of the wheel, however, any suitable shape may be used.

A third securement member secures together the first plate, the second plate, and the wheel 12. An an example, the third securement member may be a threaded shaft 90 for threaded engagement with the threaded bore 88 of the knurled handle 80. When assembled, the shaft 90 extends through the wheel hole 14 and at least partially through the threaded bore 34 of the first disk 30.

A snap ring 92 fits within a groove in the knurled handle 80 and within a groove in the second disk 70 and holds the knurled handle 80 and the second disk 70 together.

A cutting tool 100 has a first end 102 for cutting, a second end 104 for providing a handle, and a shank 106 therebetween. The first end 102 has at least one cutting edge 108. Preferably, three cutting edges 108 are spaced approximately 120° apart and are positioned at an angle with respect to the shank 106 of the cutting tool 100. The angle of the cutting edges 108 corresponds to the taper 18 of the lug nut hole 16. The cutting edge 108 may include slots for insertion of cutting inserts, such as carbide inserts or any other type of cutting tools.

A pin 114 extends from the first end 102 of the tool 100 and is positioned centrally between the cutting edges 108. The pin 114 is attached to the cutting tool 100 by a fastener 116, such as a bolt, set screw or the like. The pin 114 is sized and adapted to be disposed within the hole 44 of the bushing 42 of the first plate for aligning the cutting tool 100 within the lug nut hole 16. The pin 114 controls or guides positioning of the cutting tool 100. An alignment of the cutting tool 100 within the first securement member 20 of the lug nut taper trueing tool 10 aligns the cutting edges 108 with the taper 18 of the lug nut hole 16 for enabling the cutting tool 100 to evenly and symmetrically clean debris, remove material therefrom, and true up the taper 18 and lug nut hole 16.

The handle portion of the second end 104 of the cutting tool 100 includes a knurled handle 120 slid onto the second end 104 and secured with a fastener 122, such as a bolt, screw or the like. The fastener 122 may be threaded through a threaded bore of the knurled handle 120 and into a threaded bore of the second end 104.

For the various embodiments of this invention, the same reference characters will be used to designate like parts. In addition, like functions and like interactions of the parts among the various embodiments of this invention will not be repeated for each embodiment.

Figure 3:
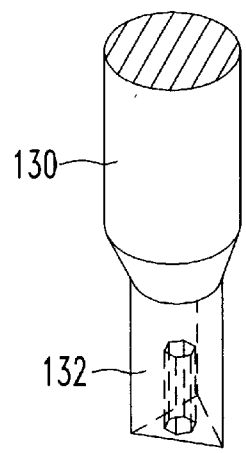
FIG. 3 is an alternative embodiment of a cutting tool of the lug nut taper trueing tool.

Alternative embodiments of this invention comprise the lug nut taper trueing tool 10 employing various cutting tools. Referring to FIG. 3 and using the same reference characters to define like parts, an alternative embodiment of the cutting tool 100 as illustrated in FIGS. 1–2 may be a cutting tool 130 having like parts as the cutting tool 100 and alternatively having the second end 104 engagable with an automatically rotating device (not shown), such as a drill or the like. The second end 104 is sized and adapted for insertion into the rotating device, such as by having a shaft end 132 mateable with a connector of the rotating device.

Referring again to FIG. 2 and using the same reference characters to define like parts, an alternative embodiment of the cutting tool 100 as illustrated in FIG. 1 may be the cutting tool 130 having like parts as the cutting tool 100 and additionally having a second cutting edge 136 which extends from the first end 102 and is positioned perpendicular to the shank 106 of the cutting tool 103. The cutting edge 136 enables the cutting tool 136 to cut or remove debris from the face 140 of the wheel 12.

In operation, the components of the first and second portions 20 and 22 are assembled. The handle 60 is attached to the first disk 30. The bushings 42 are disposed within the holes 36 of the first disk 30 having the flange 46 of the bushing 42 extending therefrom and the shoulder 48 seated against the first disk 30. The set screw 52 is inserted through the bore 40 and secures the bushing 42 within the hole 36.

The knurled handle 80 is secured to the second disk 70 with the snap ring 92. The threaded shaft 90 is threaded into the knurled handle 80.

After assembly, a person can grasp the handle 60 of the first disk and position the first disk 30 of The lug nut taper trueing tool 10 on one side of the automobile wheel 12. As the first disk 30 is positioned adjacent to the wheel 12, the extension 32 of the first disk 30 is disposed within the center hole 14 of the automobile wheel 12 and the flanges 48 of the bushings 42 are inserted within the lug nut holes 16 of the automobile wheel 12.

The second disk 70 is positioned on the other side of the automobile wheel 12 and by grasping the knurled handle 80 and rotating the second disk 70, the threaded shaft 90 is threaded into the center bore 34 of the first disk 30 and secures the first disk 30, the second disk 70, and the automobile wheel 12 together.

The cutting tool 100 or 130 is positioned adjacent the lug nut hole 16 and the pin 114 is inserted into the hole 44 of the bushing 42 until the cutting edges 108 are disposed within the lug nut hole 16 and contact the taper 18 of the lug nut hole 16. After the cutting tool 100 is properly positioned, a person may grasp the knurled handle 120 and rotate the cutting tool 100 by hand to clean and true up the lug nut holes 16.

To use the cutting tool 130, the shaft end 132 is disposed within the rotating mechanism, such as a drill, and is automatically rotated to clean and true up the lug nut holes 16, and/or face 140 of the automobile wheel 12.

An advantage of the lug nut taper trueing tool 10 is that the tool 10 can be used to remove debris, such as glue, dirt, tar or the like, from the lug nut hole 16 including the taper 18 to true up the lug nut hole 16. The truing tool can also be used to remove debris from the face 140 of the wheel 12.

By using the trueing tool 10, the tool 100 or 130 can be precisely located within the lug nut hole 16 for enabling the cutting edge 108 to accurately restore the shape and design of the lug nut hole 16 and provide a concentric and symmetric lug nut hole 16. The rod 114 of the cutting tool 100 or 130 inserted through the bushing 42 in combination with the extension 32 positioned within the wheel hole 14 enables precise positioning of the cutting tool 100 or 130 within the lug nut hole 16 of the wheel. The rod 114 controls or guides positioning of the cutting tool 100 or 130 during rotation of the cutting tool 100 or 130, enabling the lug nut hole 16 to be precisely cut, bored, cleaned, and trued.

Thus there has been shown and described a novel lug nut taper trueing tool which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A lug nut taper trueing tool for a vehicle wheel, said wheel having a first side, a second side, a wheel hole therethrough, and a plurality of lug nut holes, comprising:

a first plate positioned on said first side of said wheel and having at least one hole alignable with said lug nut holes of said wheel;

a second plate positioned on said second side of said wheel;

a shaft disposed through said wheel hole of said wheel and engagable with said first and second plates for securing said wheel, said first plate and said second plate together;

a cutting tool having a first end, a second end, and a shank therebetween, said cutting tool having a pin extending from said first end and sized for insertion into said hole of said first plate, said first end having at least one cutting edge for cutting said lug nut hole while said pin is disposed within said first plate; and wherein said first plate is disposed on the opposite side of said wheel as said cutting tool second end.

2. The trueing tool according to claim 1, further comprising a bushing positioned within said hole of said first plate having a flange sized to fit within said lug nut hole of said wheel, said bushing having a hole at least partially therethrough for insertion of said pin.

3. The trueing tool according to claim 1, wherein said cutting tool includes a handle at said second end for enabling a person to manually rotate said cutting tool.

4. The trueing tool according to claim 1, wherein said cutting tool includes a shaft end at said second end for enabling mechanical attachment of said cutting tool for automatically rotating said cutting tool.

5. The trueing tool according to claim 1, wherein said lug nut hole of said wheel has a taper, and wherein said cutting edge of said cutting tool is positioned at an angle corresponding to said taper of said lug nut hole.

6. The trueing tool according to claim 1, wherein said first plate has an extension sized to fit within and extend at least partially through said wheel hole of said wheel.

7. The trueing tool according to claim 1, wherein said wheel has a face, and wherein said cutting tool has a first cutting edge for cutting said lug nut hole and a second cutting edge for removing material from said face of said wheel.

8. The trueing tool according to claim 1, further comprising a handle attached to said first plate.

9. The trueing tool according to claim 1, further comprising a handle attached to said second plate.

10. A lug nut taper trueing tool for a vehicle wheel, said wheel having a first side, a second side, a wheel hole therethrough, and a plurality of lug nut holes, comprising:

a first securement member positioned on said first side of said wheel and having a bore at least partially therethrough and positioned substantially at a center of said first securement member and said first securement member having an outer edge, said first securement member having at least one hole positioned between said bore and said outer edge of said first securement member and alignable with said lug nut holes of said wheel;

a second securement member positioned on said second side of said wheel;

a third securement member engagable with said first securement member and said second securement member;

a cutting tool having a first end, a second end, and a shank therebetween, said cutting tool having a pin extending from said first end and sized for insertion into said hole of said first securement member, said first end having at least one cutting edge for cutting said wheel while said pin is disposed within said first securement member; and wherein said first plate is disposed on the opposite side of said wheel as said cutting tool second end.

11. The trueing tool according to claim 10, wherein said first securement member includes a bushing positioned within said hole of said first securement member having a flange sized to fit within said lug nut hole of said wheel, said bushing having a hole at least partially therethrough.

12. The trueing tool according to claim 10, wherein said cutting tool comprises:

a shaft end at said second end for enabling mechanical attachment of said cutting tool for automatically rotating said cutting tool; and a handle engagable with said shaft end for enabling a person to manually rotate said cutting tool.

13. The trueing tool according to claim 10, wherein said lug nut hole of said wheel has a taper, and wherein said cutting edge of said cutting tool is positioned at an angle corresponding to said taper of said lug nut hole.

14. The trueing tool according to claim 10, wherein said wheel has a face, and wherein said cutting tool has a first cutting edge for cutting said lug nut hole and a second cutting edge for removing material from said face of said wheel.

15. A lug nut taper trueing tool for a vehicle wheel, said wheel having a first side, a second side, a wheel hole therethrough, and a plurality of lug nut holes, comprising:

a first plate positioned on said first side of said wheel, said first plate having an extension and a threaded bore at least partially therethrough and positioned substantially at a center of said first plate and said first plate having an outer edge, said extension sized to fit within and extend at least partially through said wheel hole of said wheel, said first plate having at least one hole positioned between said bore and said outer edge of said first plate and alignable with said lug nut holes of said wheel, said first securement member having a handle;

a bushing positioned and secured within each of said holes of said first plate having a flange sized to fit within said lug nut hole of said wheel, said bushing having a hole at least partially therethrough;

a second plate positioned on said second side of said wheel;

a knurled handle secured to said second plate and having a threaded bore;

a threaded shaft threadedly engagable with said threaded bore of said knurled handle and with said threaded bore of said first plate for securing said first plate, said second plate, and said wheel together;

a cutting tool having a first end, a second end, and a shank therebetween, said cutting tool having a pin extending from said first end and sized for insertion into said hole of said bushing, said first end having at least one cutting edge for cutting said lug nut hole while said pin is disposed within said bushing; and wherein said first plate is disposed on the opposite side of said wheel as said cutting tool second end.

16. The trueing tool according to claim 15, wherein said cutting tool includes a handle at said second end for enabling a person to manually rotate said cutting tool.

17. The trueing tool according to claim 15, wherein said cutting tool includes a shaft end at said second end for enabling mechanical attachment of said cutting tool for automatically rotating said cutting tool.

18. The trueing tool according to claim 15, wherein said lug nut hole of said wheel has a taper, and wherein said cutting edge of said cutting tool is positioned at an angle corresponding to said taper of said lug nut hole.

19. The trueing tool according to claim 15, wherein said cutting tool has at least three cutting edges.

20. The trueing tool according to claim 15, wherein said wheel has a face, and wherein said cutting tool has a first cutting edge for cutting said lug nut hole and a second cutting edge for removing material from said face of said wheel.

* * * * *